(12) United States Patent
Wu et al.

(10) Patent No.: US 11,531,876 B2
(45) Date of Patent: Dec. 20, 2022

(54) DEEP LEARNING FOR CHARACTERIZING UNSEEN CATEGORIES

(71) Applicant: University of Florida Research Foundation, Incorporated, Gainesville, FL (US)

(72) Inventors: Dapeng Oliver Wu, Gainesville, FL (US); Pratik Brahma, San Mateo, CA (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 1057 days.

(21) Appl. No.: 15/939,717

(22) Filed: Mar. 29, 2018

(65) Prior Publication Data

US 2018/0285739 A1    Oct. 4, 2018

Related U.S. Application Data

(60) Provisional application No. 62/478,094, filed on Mar. 29, 2017.

(51) Int. Cl.
*G06N 3/08* (2006.01)
*G06N 3/04* (2006.01)

(52) U.S. Cl.
CPC ............ *G06N 3/08* (2013.01); *G06N 3/04* (2013.01); *G06N 3/0427* (2013.01); *G06N 3/0445* (2013.01); *G06N 3/0454* (2013.01)

(58) Field of Classification Search
CPC ...... G06N 3/04; G06N 3/0427; G06N 3/0445; G06N 3/0454; G06N 3/08
See application file for complete search history.

(56) References Cited

U.S. PATENT DOCUMENTS

2017/0039469 A1*    2/2017   Majumdar ........... G06K 9/4628

OTHER PUBLICATIONS

Neural Memory Networks (David Biggs and Andrew Nuttall) taken from http://cs229.stanford.edu/proj2015/367_report.pdf (Year: 2015).*
A Self-Organized Neural Comparator (Guillermo A. Luduena, Claudius Gros) taken from https://arxiv.org/abs/1210.6230#:-:text=We%20propose%20an%20unsupervised%20neural,without%20external%20influence%20or%20supervision. (Year: 2012).*
Complex-Sigmoid Function for Complex-Valued Neural Networks (Gouhei Tanaka) taken from http://www.kurims.kyoto-u.ac.jp/-kyodo/kokyuroku/contents/pdf/1742-18.pdf (Year: 2011).*
Memory Augmented Neural Networks with Wormhole Connections (Gulchere, Chandar, Bengio) taken from https://www.researchgate.net/publication/313100943_Memory_Augmented_Neural_Networks_with_Wormhole_Connections (Year: 2017).*

(Continued)

*Primary Examiner* — Benjamin P Geib
(74) *Attorney, Agent, or Firm* — Alston & Bird LLP (57) ABSTRACT

Systems and methods for a computer-based visual recognition based upon a spatially forked deep learning architecture, including unification of deep learning and reasoning. A method can include a primary learner with an adjacent structured memory bank that can not only predict the output from a given input, but also relate the input to all past memorized instances and help in creative understanding.

20 Claims, 2 Drawing Sheets

(56) References Cited

OTHER PUBLICATIONS

One-shot Learning with Memory-Augmented Neural Networks (Adam Santoro • Sergey Bartunov • Matthew Botvinick • Daan Wierstra • Timothy Lillicrap) taken from https://paperswithcode.com/paper/one-shot-learning-with-memory-augmented (Year: 2016).*

End-To-End Memory Networks (Sainbayar Sukhbaatar, Arthur Szlam, Jason Weston, Rob Fergus) taken from https://arxiv.org/abs/1503.08895 (Year: 2015).*

Smolensky, "Connectionist AI, symbolic AI, and the brain," Artificial Intelligence Review, Jun. 1987, pp. 95-109, vol. 1.

Brahma et al., "Why deep learning works: a manifold disentanglement perspective," IEEE Transactions on Neural Networks and Learning Systems, Dec. 2015, pp. 1-12.

Fei-Fei et al., "One-shot learning of object categories," IEEE Transactions on Pattern Analysis and Machine ntelligence, Apr. 2006, pp. 594-611, vol. 28, No. 4.

Larochelle et al., "Zero-data learning of new tasks," Proceedings of the Twenty-Third AAAI Conference on Artificial ntelligence, Jul. 2008, pp. 646-651.

Socher et al., "Zero-shot learning through cross-modal transfer," Advances in Neural Information Processing Systems, Mar. 2013, pp. 1-7.

Lampert et al., "Learning to detect unseen object classes by between-class attribute transfer," IEEE Conference on Computer Vision and Pattern Recognition, Jun. 2009, pp. 951-958.

Rohrbach et al., "Transfer learning in a transductive setting," Proceedings of the 26th International Conference on Neural Information Processing Systems, Dec. 2013, pp. 1-9.

Palatucci et al., "Zero-shot learning with semantic output codes," Proceedings of the 22nd International Conference on Neural Information Processing Systems, Dec. 2009, pp. 1-9.

The Theano Development Team, "Theano: a python framework for fast computation of mathematical expressions," Cornell University Library, May 2016, pp. 1-19, https://arxiv.org/abs/1605.02688.

Brahma, P. P. et al., *Unification of Deep Learning and Reasoning* (Research Paper) (undated), 5 pages.

Chollet, F., *Keras* [online] [retrieved Aug. 2, 2018]. Retrieved from the Internet: <URL: https://github.com/keras-team/keras>. (undated) 5 pages.

* cited by examiner

DEEP LEARNING FOR CHARACTERIZING UNSEEN CATEGORIES

CROSS-REFERENCE TO RELATED APPLICATION

This application claims the benefit of U.S. Provisional Application Ser. No. 62/478,094, filed Mar. 29, 2017, which is incorporated herein by reference in its entirety. including any figures, tables, and drawings.

BACKGROUND

Artificial Intelligence (AI) and deep learning research have been moving in the direction of emulating the human brain both functionally as well as structurally. The human brain can still perform a lot of activities that computers still cannot. This includes understanding the core meaning of a document or arguing about the context of a scene in a movie or even being able to have a meaningful human conversation. The human intelligence system performs multiple duties of learning, understanding, discriminating, imagining, inferring, memorizing, retrieving, providing feedback and deciding how to react to a given situation. Although the various components of the human brain perform differently, the fundamental building units are based on neurons and synapses. As is common in deep learning architecture, neurons are also stacked in hierarchical layers in order to capture various levels of semantic and abstract information about a given input. It is encouraging to see that modern neural network models can provide interpretable insights to support such hypotheses regarding the human brain structure. However, there are still many areas for improvement in AI technology.

BRIEF SUMMARY

Embodiments of the present invention include methods and apparatuses for use in artificial intelligence and relate to unification of deep learning and reasoning. An apparatus can include a primary learner with an adjacent structured memory bank that can not only predict the output from a given input but also relate the input to all past memorized instances and assist in creative understanding. A spatially forked deep learning architecture can provide predicting and reasoning in relation to the nature of an input belonging to a category that has not been encountered in training data by relating the input with memorized past representations at higher layers.

Embodiments of the subject invention include the ability to learn attributes of an object without a training sample. In contrast, most existing AI methods require a large number of training samples The devices and methods described herein are capable of automatically defining new concepts based on previously learned concepts.

Furthermore, embodiments of the subject invention can have multiple learning components running in parallel. Of the multiple learning components running in parallel, one component can be for deep learning and other components can be directed to property analysis for when new concepts, objects, or classes of data are detected.

DETAILED DESCRIPTION

Traditional connectionist approaches to AI learn computational mapping from vectorial inputs to vectorial outputs. In contrast, symbolic logic or reasoning involves rule based expert systems, for example, in structured language models. Researchers have generally chosen their approach based on the given task, but optimally an AI system should be able to incorporate both similar to the human brain. Frameworks for deep learning that can learn to map inputs to outputs and learn comparative relationships between input classes with the help of an explicit memory.

Such models can not recognize new samples of previously analyzed classes and identify and characterize novel observations. Therefore, embodiments of the present invention can help in producing an artificial model that acts and thinks more like humans.

The concept of associated memory has been the crux of neural network learning where the values of the connection weights act as the storage component of the model. However, recent research, like long short-term memory units (LSTMs) and memory networks, has been in the direction of storing and retrieving internal representations of the data in a concise yet effective way. One example is capturing the representation of certain examples of each class at the output of the higher layers after a few epochs of training and then using these memorized vectors can be to pull representations of inputs during the next phase of training. However, finding good representations in manifold shaped data is a challenging problem. Normal interpolation and nearest neighbor search generally fail to operate successfully in manifold shaped datasets. However, thanks to deep learning, flattened versions of the manifolds represented in the higher layers can be achieved.

End to end memory networks and neural turing machines have advanced the periphery of deep learning research towards using readable and writeable external memory. However, these approaches attempt to produce a vector space representation for all stored memories. Although it is easier to mathematically model such frameworks, some memories may be symbolic while some may also be relational or comparative. For example, the relationship between father and son or intensity of the color brightness of one flower as compared to another. When people undergo the process of remembering, they do not perform an exhaustive search of all past instances. The brain streamlines the thinking as per the format of memory storage, providing motivation towards coming up with a structured memory framework. Embodiments of the present invention contemplate putting this under the general framework of deep learning to make it universally applicable for various applications where deep learning architectures are already triumphing. Such frameworks can attach a data structure, like graphs or trees, to the stored memory vectors and the AI is asked to automatically organize and incorporate their use in its learning process. These strategies can also help in learning the concepts behind a given task and can thus, like humans, do analysis to some extent on even unseen inputs or observations.

Zero shot learning or zero data learning involves finding a generalized model to perform classification in the absence of training data, with only minor description of the class or additional information One shot learning involves showing only one (or very few) of the instances of a category to the model during the training phase. The motivation to build such techniques is learning the ability to identify objects on first impressions.

Generally, a parametric model is used to deal with such frameworks in which the class of an input is considered to be a function of its description (or some representational features). This approach involves using domain adaptation and transfer learning, i.e., taking a model that has been learned in one setting or distribution and using it to test or to perform another task. This can include, for example, testing the ability of a character recognition classifier to discriminate between two character classes not found in the training set. Therefore, even if the test data and its distribution are different, the task is related or similar to a generalized model that is expected to serve the purpose. Such problems are increasingly becoming common now in the days of big data when there are many species, products, objects or activities without any labeled data but still having some knowledge for identification.

The concept of outlier detection can be used to detect unseen classes in a semantic space, which is different from simply discriminating between zero shot classes. However, this approach requires multi-modal data to map between image feature space and word space vectors and they are still not able to characterize a new or unseen class's input. Attribute based classification has been introduced in which object detection is performed based on human specified high level description of the target objects. The description can include shape, color, as well as other information and new classes can be detected based on their attribute representation. However, in real situations, such rich information for all training images is not available. As a comparison, the human brain does not appear to learn by computing specific features for each view either. The theory behind graph based semi-supervised learning has been used for transfer learning and comparisons with earlier methods on datasets like Animals with Attributes and ImageNET. External knowledge sources and similarity measures have also been used to perform such few shot learning.

Semantic output code based classifiers can be applied towards predicting words people are thinking about from their fMRI images without training examples for those words. While it is clear that the objective is to learn a representation space where extrapolation of novel classes can be done in a better way, such works have not leveraged the relationship between classes which may come in need during certain problems nor have they shown how the knowledge of a novel class can help reshape the knowledge of the past comprising of inputs belonging to known categories.

For illustration, embodiments of the present invention are analyzed in the context of classifying and differentiating simple geometric figures. A polygon can be defined by the number of edges it possesses. For example, a triangle has three edges whereas quadrilaterals and pentagons have four and five edges, respectively. The edges are separated by points, lines, and angles. Now, suppose a student has only been taught the lines and angles of quadrilaterals and polygons in his or mathematics or geometry class. The student is presented with a drawing of a triangle, might identify it as a novel geometrical figure, but be able to reason that this shape has one more edge than an angle and one less edge than a quadrilateral. However, a discriminative artificial model like a neural network will either wrongly classify it as one of the other shapes or simply report it as an unidentifiable polygon. This is an important distinction of the present invention relative to the prior art—using the concept (i.e., the number of edges in this example) creatively to address the characteristics of a new unseen example to more closely imitate the thinking and reasoning of a human.

The above referenced problem can be addressed using the representations obtained from a deep learning network. In the process of learning the mapping from images to their output name class, embodiments of the present invention can also implement a comparator module 300 that can determine the relationship between classes. The result produced by the comparator 300 may be a ternary (conditional) variable outputting greater than (+1), less than (−1), or equal to (0). When the problem domain is different, it may also output a graphical adjacency matrix describing the relationship between two given inputs. While the latter can be suitable for face characterization, the problem of understanding geometrical shapes may be served best by the use of the ternary comparator 300. Also, as is the case with the human learning process, the artificial model is not provided with what exact feature or knowledge it should search for in the input 100. Thus, the artificial model has to learn the true concept in order to discriminate between the images belonging to the known geometrical classes and be able to characterize unseen ones.

Figure 1:
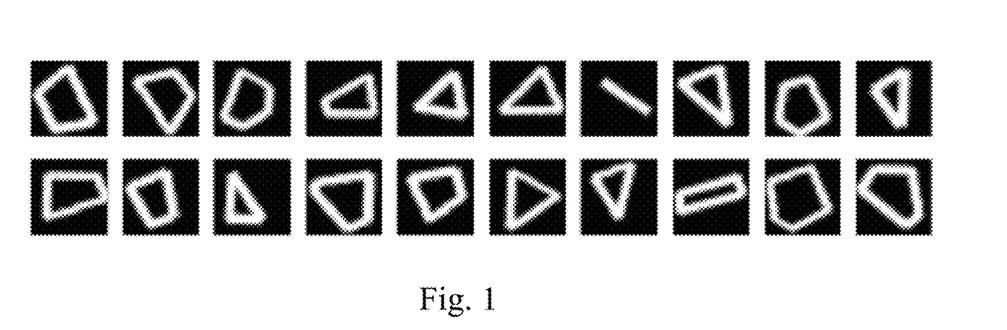
FIG. 1 is a diagram of different geometrical shapes.
Figure 2:
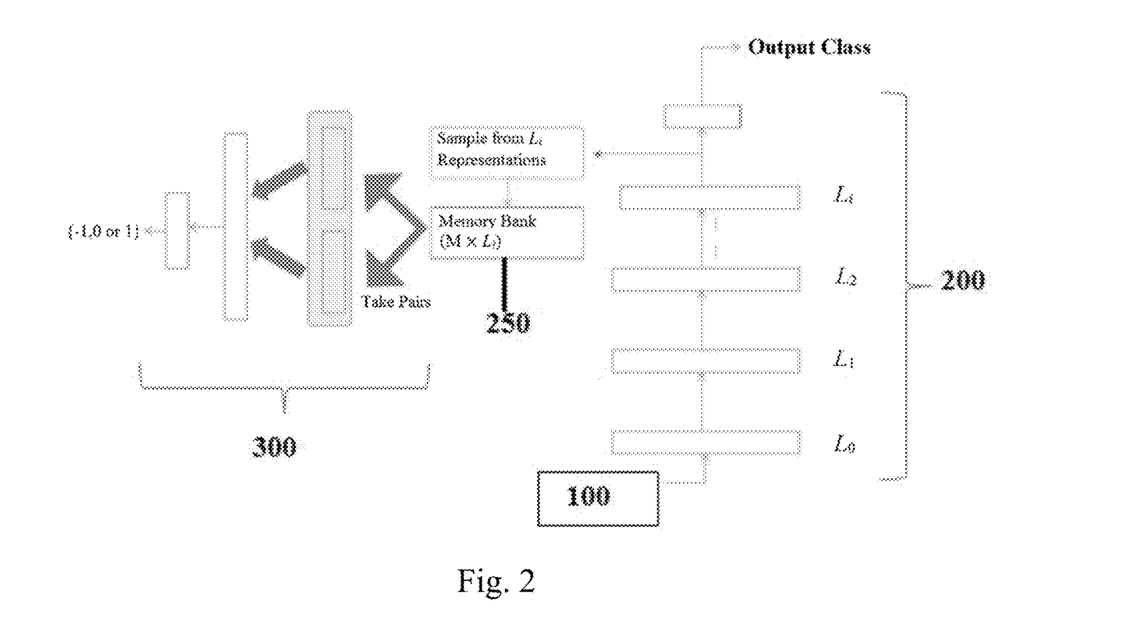
FIG. 2 is a spatially forked model with a primary learner and a comparator network to classify as well as characterize by relating to past memory.
Figure 3:
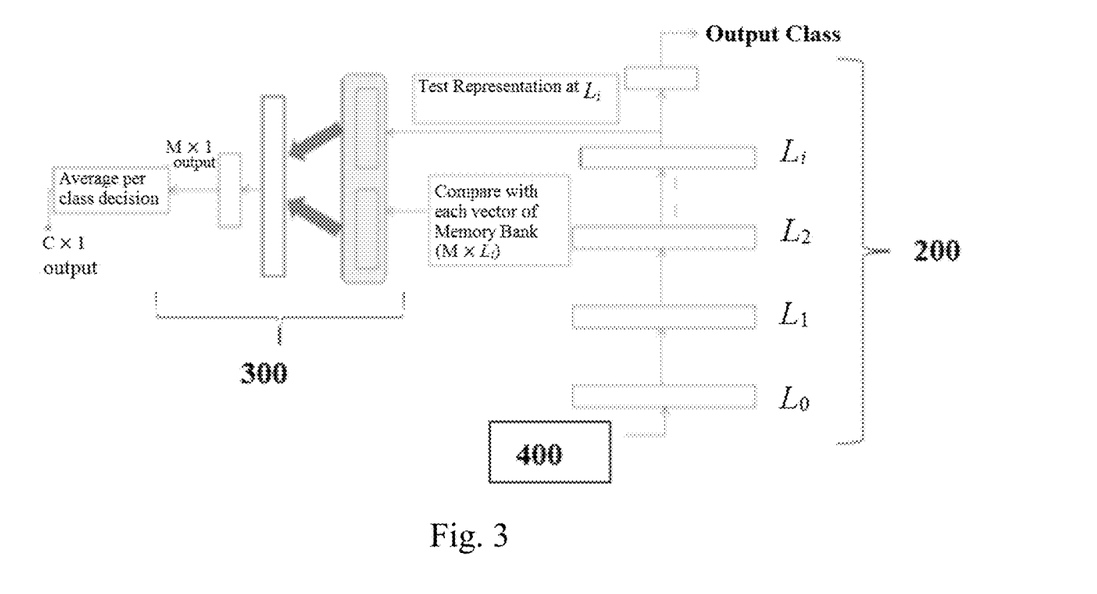
FIG. 3 is a spatially forked model with a primary learner and a comparator network to classify as well as characterize by relating to past memory.

FIGS. 2 and 3 are spatially forked models with a primary learner 200 and a comparator network 300 to classify and characterize by relating unknown inputs 400 to past memory. The input data matrix $X_c$ can consist of N grayscale images of m×m pixels. Geometrical shapes, as seen in FIG. 1, in the input images can have variations in angular combination (sometimes even concave), scale, width, orientation and position in the image frame. The target Y is a N×1 vector that denotes the label for each of the geometrical shapes. A model can be trained with line segments, angles, quadrilaterals, and pentagons. Therefore, after training, an image 400 containing a triangle can be considered zero shot data. In this case, the number of classes C equals 4 (C=4). Thus, a model needs to learn a mapping function that finds out the label $Y_i$ for a given input image $X_i$. A comparator target matrix Z whose $(i, j)^{th}$ entry can be used to ascertain whether the shape of $X_i$ has greater (+1), less (−1) or equal number of edges (0) as that of $X_j$. Now, when a new input 400 is entered, the model does not have to start comparing the new input with each and every past instance seen in the training data. Instead, the representation space can be treated as a better memory bank 250 of the true concept and the memorized instances can be used to learn the relationship given by Z. Therefore, the number of instance comparisons would be far less, of $O(C^2)$ instead of being $O(N^2)$, where O denotes order of (e.g., finding a particular entry in a list with n elements each is order of n while sorting them is order of $n^2*\log(n)$).

A primary learner 200 can be a deep learning architecture with a loss function $l_p(\Theta)$, such as categorical cross entropy for classification, where $\Theta=[\Theta_1, \Theta_2, \ldots, \Theta_d]$ represents the weights and biases of the network with depth d. For example, the primary learner 200 can comprise a convolutional neural network (CNN). The representatives can be sampled from the fully connected layer of the network. If M representatives are sampled from the $i^{th}$ layer of the network that contains li number of neurons, the representation memory bank $R_i \in R^{M \times li}$ 250 can be formed. While each input 100 will have its own representational output at the end of the $i^{th}$ layer, it is important to note that the number of sampled memories, M, is generally going to be fewer than the total number of training observations N. The combined result of all the transfer functions $f_i(.)$, which includes the activation function of the $i^{th}$ layer, and the sampling function $g(.)$ at the higher layer gives rise to the representation memory bank 250.

$$R_k^i = g(f_i( \ldots f_2(f_1(X_k)))) \quad (1)$$

To universalize the application of deep learning, a Siamese style network design can be employed for the comparator network 300. This approach can have two input chains merging together propagating through the layers and resulting in a single output. This can be used as the adjacent memory based architecture to learn the relationships in the training phase. The comparator network 300 need not be deep like the primary learner 200. In fact, for the polygon characterization problem, the comparator network 300 may only need a couple of nonlinear layers with the tan h activation function. During the training phase, the input to the comparator model 300 can be in pairs of tensors from the representation bank (Rp/i, Rq/i), 250 and the relationship status can be outputted as a ternary variable. If the training of the comparator network 300 is performed independent of the primary learner 200 by using offline stored representation banks, then the loss function is $1_C(\Gamma 1, \Gamma 2, \ldots \Gamma q)$. Given the nature of the polygon characterization problem, a skew symmetric non-linear mapping function can be used to take these pairs as inputs and predict the edge based relationship between the classes of the polygons that their respective images contain, where t in (2) below is the skew symmetric nonlinear function.

$$t(R_i^p \cdot R_i^q) = -t(R_i^q \cdot R_i^p) \quad (2)$$

During a testing phase, each new image can give a single class identification output as per the primary learner 200, but its corresponding representation at the considered layer will be compared with the M sampled memories in the representation bank 250 to output class C ternary quantities to indicate what those memories for each previously known category think about this new input 400 (i.e., each of the memories from the representation bank 250 can compare itself with the given input in the test phase to quantify what the new input's relationship should be with itself). This is dependent on the threshold value $\gamma$, which can be approximately the radius of influence sphere for each category. Assuming there are an M/C number of representatives in the memory bank for category k, the decision of a new test input $X_{test}$ as perceived by the representatives of category k can be given as:

$$\text{sgn}\left(\frac{C}{M} \sum_{j \in \text{class } k} t(R_j \cdot R_{X_{test}}) - \gamma\right). \quad (3)$$

Using a combination of all these outputs, judgements can be made according to whether there is a new instance of a previously known geometrical shape class or a whole new unseen shape altogether.

Embodiments of the present invention can include a spatially forked deep learning architecture aided with structured memorization that can not only predict test instances from previously known categories, but also characterize novel inputs from unknown classes. This framework is especially helpful in zero shot learning or few shot learning when there are no or few exemplars from a particular class in training data. The proposed architecture is adaptable to different types of neural networks and can include two primary components, a primary learner 200 and a comparator network 300.

The primary learner 200 can be a conventional multi-layered neural network or a convolutional neural network that can be trained either discriminatively or generatively with an additional classifier on its feature output. The intermediate representations of the training data at the $i^{th}$ layer of the primary learner 200 can be sampled using a class specific sampling function $g(.)$ to form a representation memory bank R 250.

Pairs of tensors from the representation bank $(R_i^a, R_i^b)$ corresponding to classes a and b can be input to the comparator network 300. The comparator network 300 can be trained using relationships between the classes, which can be represented as an adjacency matrix Z. This helps provide structure to the memories.

Instead of training the comparator network 300 with each possible pair of input data, the representational subspace can be treated at higher layers as a disentangled, flatter and invariant manifold by virtue of which sampled memories are enough to learn the relationship between classes using Z. Therefore, the computational complexity can be reduced from $O(N^2)$ to $O(C^2)$, where N and C are the number of input examples and number of categories or classes in the training data 100, respectively.

In the test phase, each input 400 is subject to the primary learner 200 and its representation at the $i^{th}$ layer is compared with the sampled memories from the representation bank using the comparator network 300. A threshold value $\gamma$, which is basically the radius of influence for each category, is applied on each output at the comparator network 300 followed by a sign function. This determines whether the input belongs to one of the previously known groups and, if not, it decides the test input to be an outlier and gives a symbolic relationship with respect to the known classes.

Figure 4:
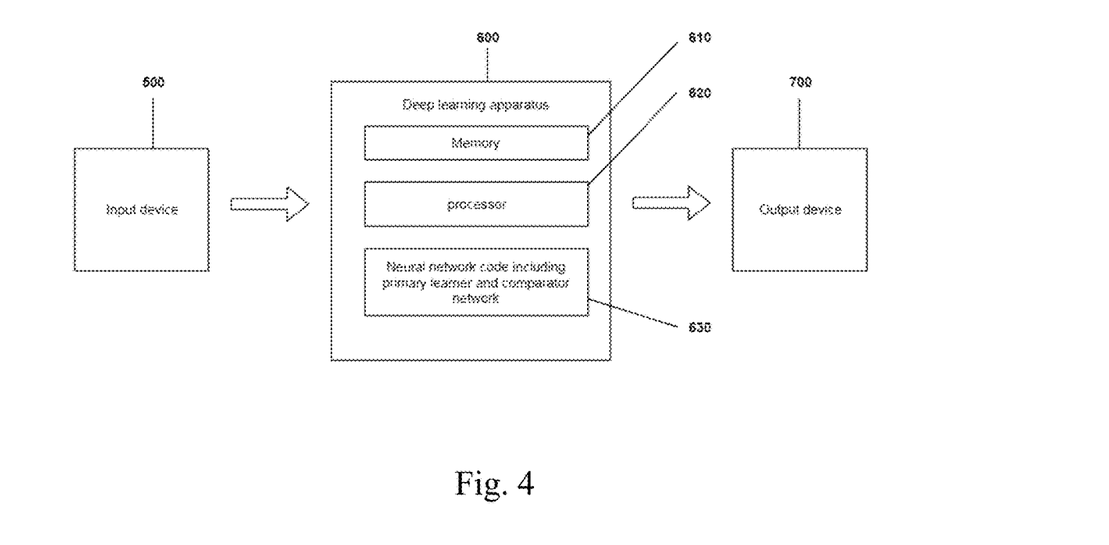
FIG. 4 is a block diagram illustrating a deep learning computer based system including a primary learner and a comparator network.

FIG. 4 is a block diagram of a deep learning computer system 100 programmed to implement the methods to those described herein. A input device 500 can be configured to receive or capture, via a sensor, or peripheral device, inputs or visual images provided by a user. The input device 500 can receive images 100, 400 manually or from a remote location via an electronic communication. A communication network may be, for example, a communications port, a wired transceiver, a wireless transceiver, and/or a network card. The communication network may be capable of communicating using technologies such as Ethernet, fiber optics, microwave, xDSL (Digital Subscriber Line), Wireless Local Area Network (WEAN) technology, wireless cellular technology, BLUETOOTH technology and/or any other appropriate technology. The input device 500 directly or wirelessly transmit received inputs to the deep learning apparatus 600 comprising working memory and non-volatile program memory 610, a processor 620, and deep learning code 630 that configured to enable primary learner 200 and comparator network 300 functionality. Additionally parameter memory 610 can store the weights and biases of the neural network. The memory device 610 may be or include a device such as a Dynamic Random Access Memory (D-RAM), Static RAM (S-RAM), or other RAM or a flash memory. The deep learning code 630 can be embedded within the deep learning device 600 or provided by an external source. The external storage may be or include a hard disk, a magneto-optical medium, an optical medium such as a CD-ROM, a digital versatile disk (DVDs), or BLU-RAY disc (BD), or other type of device for electronic data storage. The deep learning apparatus 600 can process the input images 100, 400 and return a result to an output device 700. The output device 700 can be in electronic communication to the deep learning device directly through a system of wires or wirelessly.

Although FIG. 4 shows that the deep learning system comprises a single memory device 610, a single processor 620, single input device 500, a single output device 700, the can include multiples of each or any combination of these components, and may be configured to perform analogous functionality to that described herein.

In some embodiments the input device 500, the deep learning apparatus 600 and the output device 700 are a single device. In other embodiments, the input device 500, the deep learning apparatus 600, and the output device 700 can be remotely situation and connected via a communication network.

In an embodiment of the subject invention, the devices and methods described herein can be applied to field of computer vision, simulating the kind of learning problems a typical human goes through. Humans tend to identify people by observing their faces. In this learning process, the neurons of the brain have learned to identify and memorize key features from what the eyes see. However, when encountering a person never seen before, they are not treated as an outlier or novelty. Humans rather characterize their facial appearance by comparing with knowledge acquired from all of the faces the individual has seen in the past. For example, humans can not only identify a new person, but may also be able to tell what race the person belongs to because humans have learned the concept of how to characterize people from their looks. The features may include skin color, shape, size of smaller parts of the face, geometry and many other abstract features. In addition, just one sight or one meeting with a new person imprints a face in our brain so that the person can be identified again. Different faces from different races can be classified using a traditional discriminative CNN, for example, but then a new test face may be adjudged based on how it falls in comparison to others. Here, a comparator target matrix $Z(i, j)$ of an embodiment of the present invention can indicate the type of relationship between person i and j. This demonstrates how the human brain learns as a classifier and also as a comparator. It is this kind of learning that needs to be inculcated in an artificial model to make it truly intelligent.

Generative models may be more suitable for taking the role of the primary learner in some cases. In fact, generative models plus discriminative approaches may be well suited for such types of data understanding tasks. However, even discriminative primary learners like CNNs or DNNs can also make for good feature generation that can suitably create a representation memory bank that can learn relationships too.

As can be seen, models and methods of the present invention can be tuned in regards to the tradeoff between greater creativity and better classification. This is expected from a psychological perspective. An open mind is always quicker and better at grasping novel concepts.

A bridge can be formed between traditional vector space learning based on the connectionist neural networks and symbolic reasoning. Symbolic reasoning has shown great advantages in tasks involving set rules, for example, in English language modeling and understanding with set grammatical rules. In contrast, vector space learning is based on computationally transforming the data from the raw original form to feature space for learning purposes. Almost all of representation learning is focused on the latter paradigm. One of the reasons behind the recent surge of deep learning is that it could give some sense of interpretability to the features learned while training on vectorial data. Thus, it is imaginable that the same deep learning framework can also be developed to combine representation learning together with symbolic logic and reasoning.

For example, the polygon characterization problem, just like any other similar problem, can be broken down into concepts, learning problems, and reasoning. The concept can be a geometrical shape that is defined and distinguished by the number of straight edges it contains. The learning problem can be defined as identifying the polygon type given its image. The reasoning aspect can include how complex a given polygon is relative to the others.

The face characterization problem or any real world problems needing true human intelligence can be framed using this break down. Therefore, having a common deep learning model to do both learning and reasoning allows for better options to emulate the functions of the human brain. While mastering the learning problem can help identify new examples of older classes or patterns, mastering the reasoning problem can actually characterize instances of even novel unseen patterns by relating them to the older patterns. However, both of these attributes along with the true concept are essential in the total and clear understanding of the domain, which is similar to how the human brain learns and functions.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A computer-based method of visual recognition based upon a spatially forked deep learning architecture, the method comprising:
providing a primary learner comprised of:
an input layer that in configured to receive an input;
a plurality of hidden layers comprised of a plurality of nodes and edges; and
an output layer configured to output an output class of the image;
providing a comparator network in electronic communication to the primary learner and comprising a (non-transitory) computer readable medium comprising instructions that, when executed, cause at least one processor to determine a relationship between output classes;
providing training data to train the deep learning apparatus;
sampling from higher layer output to form a representation memory bank and train the comparator network;
providing unknown an unknown input to test the deep learning apparatus;
determining whether the unknown test input belongs to a known output class; and
characterizing an unknown test input symbolically with respect to a known output class.

Embodiment 2. The method of embodiment 1, wherein the input is an image.

Embodiment 3. The method according to any of embodiments 1-2, wherein each node is coupled with a bias value and each edge is coupled with a weight value.

Embodiment 4. The method according to any of embodiments 1-3, wherein the input is subject to the primary learning and the input's representation at an $i^{th}$ layer is compared with data from the representation memory bank using the comparator network.

Embodiment 5. The method according to any of embodiments 1-4, wherein the primary learner includes a conventional multi-layered neural network.

Embodiment 6. The method according to any of embodiments 1-4, wherein the primary learner includes a convolutional neural network.

Embodiment 7. The method according to any of embodiments 1-6, wherein the primary learner is trained discriminatively or generatively with a feature output additional classifier.

Embodiment 8. The method according to any of embodiments 1-7, wherein intermediate representations of the training data at an $i^{th}$ layer of the primary learner are sampled using a class specific sampling function go) to form the representation memory bank.

Embodiment 9. The method of embodiment 8, wherein pairs of tensors from the representation memory bank ($R_i^a$, $R_i^b$) corresponding to classes a and b are inputted to the comparator network.

Embodiment 10. The method according to any of embodiments 1-9, wherein the comparator network is trained using relationships between output classes that are represented as an adjacency matrix.

Embodiment 11. The method according to any of embodiments 1-10, wherein computational complexity is reduced from $O(N^2)$ to $O(C^2)$, where N is a number of input examples and C is a number of categories or classes in the training data.

Embodiment 12. The method according to any of embodiments 1-11, wherein a threshold value γ (the radius of influence for each category) is applied on each output at the comparator followed by a sign function determining whether the input belongs to a known output class.

Embodiment 13. The method according to any of embodiments 1-12, wherein if an output of the comparator network does not belong to a known output class, the test input is determined an outlier and a symbolic relationship is given with respect to the known output classes.

Embodiment 14. A system for computer-based visual recognition based upon a spatially forked deep learning architecture, the system comprising:
an input device configured to receive an input;
a deep learning apparatus in electronic communication with the input device; and
an output device in electronic communication with the deep learning apparatus and configured to receive an output from the deep learning apparatus,
wherein the deep learning apparatus comprises a (non-transitory) computer readable medium comprising instructions that, when executed, cause at least one processor to:
provide a primary learner comprised of:
an input layer that in configured to receive an input;
a plurality of hidden layers comprised of a plurality of nodes and edges; and
an output layer configured to output an output class of the image;
provide a comparator network in electronic communication with the primary learner to determine a relationship between output classes;
sample from higher layer output, form a representation memory bank, and train the comparator network;
determine whether a test input belongs to a known output class; and
characterize an unknown test input symbolically with respect to a known output class.

Embodiment 15. The system of embodiment 14, wherein the input is an image

Embodiment 16. The method according to any of embodiments 14-15, wherein each node is coupled with a bias value and each edge is coupled with a weight value.

Embodiment 17. The method according to any of embodiments 14-16, wherein the input is subject to the primary learning and the input's representation at an $i^{th}$ layer is compared with data from the representation memory bank using the comparator network.

Embodiment 18. The method according to any of embodiments 14-15, wherein the primary learner includes a conventional multi-layered neural network.

Embodiment 19. The method according to any of embodiments 14-15, wherein the primary learner includes a convolutional neural network.

Embodiment 20. A device for computer-based visual recognition based upon a spatially forked deep learning architecture, the device comprising:
a (non-transitory) computer readable medium comprising instructions that, when executed, cause at least one processor to:
provide a primary learner comprised of:
an input layer that in configured to receive an input;
a plurality of hidden layers comprised of a plurality of nodes and edges; and
an output layer configured to output an output class of the image;

provide a comparator network in electronic communication with the primary learner to determine a relationship between output classes;

sample from higher layer output, form a representation memory bank, and train the comparator network;

determine whether a test input belongs to a known output class; and characterize an unknown test input symbolically with respect to a known output class.

A greater understanding of the present invention and of its many advantages may be had from the following example, given by way of illustration. The following example is illustrative of some of the methods, applications, embodiments and variants of the present invention. They are, of course, not to be considered as limiting the invention. Numerous changes and modifications can be made with respect to the invention."

Example 1

Experiments were conducted to prove the concepts of embodiments of the present invention. The experiments were conducted using a CNN and a weight initialized deep neural network (DNN). Efforts were made to keep the effective number of free parameters the same in both the DNN and CNN. The number of artificially generated images was N=30,000 and they belonged in a balanced manner to C=4 number of classes (line segments, triangles, quadrilaterals and pentagons). Various degrees of variation including translation, rotation, intensity, scaling and affine modification were considered while preparing the dataset. As expected, the CNN of the present invention performed better in the classification task as compared to the DNN. While the CNN converged to a test accuracy of 98.25%, the DNN could only go up to 96.63%. Both the size of the dataset and the margin of performance gain was of the same order as that of the MNIST handwritten digits recognition dataset.

However, when the testing dataset starts containing images from unseen geometrical shapes, like dot points or angles, the identification of old patterns and correct novelty detection and characterization of newer shapes becomes a concern. The novelty detection percentage is calculated as the percentage of instances in which an unseen class example is accurately characterized with respect to all of the other memorized classes in the decision. On the other hand, false positive detection is the number of new test examples belonging to the known classes that were identified as a different class by at least one of the memorized classes in the representation bank. Thus, a new test image of the known class triangle receives correct decision votes of +1 from a line segment, 0 from a triangle, and −1 from pentagons, but receives 0 or +1 for an incorrect decision. Table I and II show the variation of these measures with a varying threshold level.

TABLE I

DETECTION AS WELL AS CHARACTERIZATION OF TRUE AND FALSELY DETECTED NOVEL GEOMETRICAL SHAPES WITH A DNN LEARNER

| Threshold Value | True +ve rate | False +ve Rate |
| --- | --- | --- |
| 0.05 | 89.50 | 21.70 |
| 0.10 | 84.78 | 15.70 |
| 0.15 | 78.90 | 11.10 |

TABLE I-continued

DETECTION AS WELL AS CHARACTERIZATION OF TRUE AND FALSELY DETECTED NOVEL GEOMETRICAL SHAPES WITH A DNN LEARNER

| Threshold Value | True +ve rate | False +ve Rate |
| --- | --- | --- |
| 0.20 | 73.25 | 7.12 |
| 0.25 | 66.32 | 4.98 |
| 0.30 | 64.30 | 3.25 |

As it can be seen from Table I and II, detection probability is very dependent on the threshold $\gamma$ that is chosen. Its choice leads to a tradeoff between the ability to identify known patterns versus the ability to characterize novel patterns. It is also a common occurrence with aging in real life. Adults tend to increase their threshold as they get older, restricting them to adapt to novelty understanding and learning while being very prudent in identifying patterns they already know and are within their comfort zone. On the other hand, small children with higher inquisitiveness maintain a lower threshold and are thus very active in analyzing newer observations. Thus, the results have a direct congruence with human learning psychology and it also provides motivation for having varying degrees of the threshold depending on the expectations from the task at hand.

TABLE II

DETECTION AS WELL AS CHARACTERIZATION OF TRUE AND FALSELY DETECTED NOVEL GEOMETRICAL SHAPES WITH A CNN LEARNER

| Threshold Value | True +ve rate | Fake +ve Rate |
| --- | --- | --- |
| 0.05 | 90.65 | 24.60 |
| 0.10 | 88.78 | 18.51 |
| 0.15 | 86.56 | 13.91 |
| 0.20 | 84.09 | 9.56 |
| 0.25 | 82.03 | 6.69 |
| 0.30 | 77.22 | 4.30 |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] P. Smolensky, "Connectionist AI, symbolic AI, and the brain," Artificial Intelligence Review, vol. 1, no. 2, pp. 95-109, 1987.

[2] P. Brahma, D. Wu, and Y. She, "Why deep learning works: A manifold disentanglement perspective." IEEE transactions on neural networks and learning systems, 2015.

[3] L. Fei-Fei, R. Fergus, and P. Perona, "One-shot learning of object categories," Pattern Analysis and Machine Intelligence, IEEE Transactions on, vol. 28, no. 4, pp. 594-611, 2006.

[4] I. G. Y. Bengio and A. Courville, "Deep learning," 2016, book in preparation for MIT Press. [Online]. Available: http://www.deeplearningbook.org

[5] H. Larochelle, D. Erhan, and Y. Bengio, "Zero-data learning of new tasks," in Proceedings of the 23rd national conference on Artificial intelligence-Volume 2. AAAI Press, 2008, pp. 646-651.

[6] R. Socher, M. Ganjoo, C. D. Manning, and A. Ng, "Zero-shot learning through cross-modal transfer," in Advances in neural information processing systems, 2013, pp. 935-943.

[7] C. H. Lampert, H. Nickisch, and S. Harmeling, "Learning to detect unseen object classes by between-class attribute transfer," in Computer Vision and Pattern Recognition, 2009. CVPR 2009. IEEE Conference on. IEEE, 2009, pp. 951-958.

[8] M. Rohrbach, S. Ebert, and B. Schiele, "Transfer learning in a transductive setting," in Advances in neural information processing systems, 2013, pp. 46-54.

[9] M. Palatucci, D. Pomerleau, G. E. Hinton, and T. M. Mitchell, "Zeroshot learning with semantic output codes," in Advances in neural information processing systems, 2009, pp. 1410-418.

[10] Theano Development Team, "Theano: A Python framework for fast computation of mathematical expressions," arXiv e-prints, vol.abs/1605.02688, May 2016. [Online]. Available: http://arxiv.org/abs/1605.02688

[11] F. Chollet, "Keras," https://github.com/fchollet/keras, 2015.

What is claimed is:

1. A computer-based method of visual recognition based at least in part on a spatially forked deep learning architecture, the method comprising:
training a primary learner with training data, the primary learner comprising:
an input layer configured to receive an input;
a plurality of hidden layers comprising a plurality of nodes and edges; and
an output layer configured to output an output class of the input;
sampling intermediate representations of the training data from at least one particular layer of the plurality of hidden layers of the primary learner;
generating a representation memory bank associated with a comparator network, the representation memory bank comprising classes based at least in part on the sampled intermediate representations;
training the comparator network to output a ternary conditional variable indicating a comparative relationship between a first comparator input and a second comparator input, wherein the comparator network is trained using an adjacency matrix representative of relationships between pairs of tensors corresponding to the classes from the representation memory bank;
providing an unknown test input to the comparator network;
comparing the unknown test input with the representation memory bank using the comparator network;
generating an output of the comparator network based at least in part on the comparison, the output characterizing the unknown test input symbolically with respect to a known output class; and
determining whether the unknown test input belongs to a known output class based at least in part on an output of the comparator network.

2. The method according to claim 1, wherein the input is an image.

3. The method according to claim 1, wherein each node is coupled with a bias value and each edge is coupled with a weight value.

4. The method according to claim 1, wherein the input is subject to the primary learning and the input's representation at an $i^{th}$ layer is compared with data from the representation memory bank using the comparator network.

5. The method according to claim 1, wherein the primary learner includes a multi-layered neural network.

6. The method according to claim 1, wherein the primary learner includes a convolutional neural network.

7. The method according to claim 1, wherein the primary learner is trained discriminatively or generatively with an additional classifier acting on a feature output of the primary learner.

8. The method according to claim 1, wherein intermediate representations of the training data at an $i^{th}$ layer of the primary learner are sampled using a class specific sampling function g(.) to form the representation memory bank.

9. The method according to claim 8, wherein pairs of tensors from the representation memory bank $(R_i^a, R_i^b)$ corresponding to classes a and b are inputted to the comparator network.

10. The method according to claim 1, wherein the comparator network is trained using relationships between output classes that are represented as an adjacency matrix.

11. The method according to claim 1, wherein computational complexity is reduced from $O(N^2)$ to $O(C^2)$, where N is a number of input examples and C is a number of categories or classes in the training data.

12. The method according to claim 1, wherein a threshold value γ (the radius of influence for each category) is applied on each output at the comparator followed by a sign function determining whether the input belongs to a known output class.

13. The method according to claim 1, wherein if an output of the comparator network does not belong to a known output class, the unknown test input is determined an outlier and a symbolic relationship is given with respect to the known output classes.

14. A deep learning apparatus in electronic communication with an input device configured to receive an input and an output device configured to receive an output from the deep learning apparatus, the deep learning apparatus comprising a computer readable medium comprising instructions that, when executed, cause at least one processor to:
train a primary learner with training data, the primary learner comprising:
an input layer configured to receive the input;
a plurality of hidden layers comprising a plurality of nodes and edges; and
an output layer configured to output an output class of the input;
sample intermediate representations of the training data from at least one particular layer of the plurality of hidden layers of the primary learner;
generate a representation memory bank associated with a comparator network, the representation memory bank comprising classes based at least in part on the sampled intermediate representations;
train the comparator network to output a ternary conditional variable indicating a comparative relationship between a first comparator input and a second comparator input, wherein the comparator network is trained using an adjacency matrix representative of relationships between pairs of tensors corresponding to the classes from the representation memory bank;
receive a test input via electronic communication with the input device;

compare the test input with the representation memory bank using the comparator network;

generate an output of the comparator network based at least in part on the comparison, the output characterizing the test input symbolically with respect to a known output class; and determine whether the test input belongs to a known output class based at least in part on an output of the comparator network.

15. The deep learning apparatus according to claim 14, wherein the input is an image.

16. The deep learning apparatus according to claim 14, wherein each node is coupled with a bias value and each edge is coupled with a weight value.

17. The deep learning apparatus according to claim 14, wherein the input is subject to the primary learning and the input's representation at an $i^{th}$ layer is compared with data from the representation memory bank using the comparator network.

18. The deep learning apparatus according to claim 14, wherein the primary learner includes a multi-layered neural network.

19. The deep learning apparatus according to claim 14, wherein the primary learner includes a convolutional neural network.

20. A device for computer-based visual recognition based at least in part on a spatially forked deep learning architecture, the device comprising:

a non-transitory computer readable medium comprising instructions that, when executed, cause at least one processor to:

train a primary learner with training data, the primary leaner comprising:
an input layer configured to receive the input;
a plurality of hidden layers comprising a plurality of nodes and edges; and
an output layer configured to output an output class of the image;

sample intermediate representations of the training data from at least one particular layer of the plurality of hidden layers of the primary learner;

generate a representation memory bank associated with a comparator network, the representation memory bank comprising classes based at least in part on the sampled intermediate representations;

train the comparator network to output a ternary conditional variable indicating a comparative relationship between a first comparator input and a second comparator input, wherein the comparator network is trained using an adjacency matrix representative of relationships between pairs of tensors corresponding to the classes from the representation memory bank;

receive a test input provided by a user;

compare the test input with the representation memory bank using the comparator network;

generate an output of the comparator network based at least in part on the comparison, the output characterizing the test input symbolically with respect to a known output class; and determine whether the test input belongs to a known output class based at least in part on an output of the comparator network.

\* \* \* \* \*